(12) United States Patent
Hahn et al.

(10) Patent No.: US 11,303,078 B2
(45) Date of Patent: Apr. 12, 2022

(54) ELECTRICAL CONNECTOR WITH ENHANCED DATA COMMUNICATION

(71) Applicant: ZF CV Systems Global GmbH, Bern (CH)

(72) Inventors: Wolfgang Hahn, Bloomfield Hills, MI (US); Dirk Wohltmann, Oxford, MI (US); Jon Morrison, Rochester, MI (US); David Gatti, Bloomfield Hills, MI (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 17/192,179

(22) Filed: Mar. 4, 2021

(65) Prior Publication Data

US 2021/0281030 A1    Sep. 9, 2021

Related U.S. Application Data

(60) Provisional application No. 63/087,911, filed on Oct. 6, 2020, provisional application No. 62/985,102, filed on Mar. 4, 2020.

(51) Int. Cl.
*H01R 27/02* (2006.01)
*H01R 13/447* (2006.01)
(Continued)

(52) U.S. Cl.
CPC .............. *H01R 27/02* (2013.01); *B60D 1/64* (2013.01); *H01R 13/447* (2013.01);
(Continued)

(58) Field of Classification Search
CPC .. H01R 27/02; H01R 13/447; H01R 13/5213; H01R 13/64; H01R 13/4536; H01R 2201/04; H01R 2201/26; B60D 1/64
See application file for complete search history.

(56) References Cited

U.S. PATENT DOCUMENTS 5,501,607 A  *  3/1996  Yoshioka  ........... H01R 13/5213
                                              439/142
5,580,258 A  *  12/1996  Wakata  ................... B60L 53/16
                                              439/142
(Continued)

FOREIGN PATENT DOCUMENTS

EP          1 414 117        4/2004
WO       2019/224402       11/2019
WO       2020/016420        1/2020

*Primary Examiner* — Tho D Ta
(74) *Attorney, Agent, or Firm* — Warner Norcross + Judd LLP

(57) ABSTRACT

An electrical connector for transferring electrical signals between a tractor vehicle and a trailer vehicle is provided, the electrical connector including a connector plug and a connector socket in compliance with an industry standard. The connector socket includes a plurality of male contact terminals, and the connector plug includes a corresponding plurality of female contact terminals. The connector plug and the connector socket include a secondary electrical connection to support bidirectional data communication between a tractor vehicle and a trailer vehicle with greater bandwidth. The secondary electrical connection can include an additional electrical contact within a male part for engaging an additional electrical pin within a female part, wherein the male part and the female part are joined to, but laterally offset from, the connector plug and the connector socket. Alternatively, or in addition, the secondary electrical connection can include a conductive strip on an exterior annular surface of the connector plug and a corresponding electrical contact on an interior annular surface of the socket opening.

15 Claims, 13 Drawing Sheets

(51) Int. Cl.
*H01R 13/52* (2006.01)
*B60D 1/64* (2006.01)
*H01R 13/64* (2006.01)

(52) U.S. Cl.
CPC ......... *H01R 13/5213* (2013.01); *H01R 13/64* (2013.01); *H01R 2201/04* (2013.01); *H01R 2201/26* (2013.01)

(56) References Cited

U.S. PATENT DOCUMENTS

| | | |
|---|---|---|
| 7,336,159 B2 | 2/2008 | Fackrell et al. |
| 7,435,093 B1 | 10/2008 | Harmon et al. |
| 8,232,871 B2 | 7/2012 | Lesesky |
| 8,827,729 B2 | 9/2014 | Gunreben et al. |
| 8,961,204 B2 * | 2/2015 | Hara ................. H01R 13/5213 439/142 |
| 9,312,649 B2 | 4/2016 | Wang et al. |
| 9,496,639 B2 * | 11/2016 | Harmon ................. H01R 24/66 |
| 9,559,475 B1 | 1/2017 | Shaeffer et al. |
| 9,882,319 B2 | 1/2018 | Kageta |
| 10,166,920 B2 | 1/2019 | Nalepka et al. |
| 10,361,502 B1 * | 7/2019 | Lehnert .............. H01R 13/5213 |
| 2012/0202377 A1 * | 8/2012 | Puluc ................. H01R 13/5219 439/559 |
| 2018/0215254 A1 * | 8/2018 | Jobst ................. H01R 13/6397 |
| 2018/0233868 A1 * | 8/2018 | Hachadorian ........ H01R 12/718 |
| 2019/0322186 A1 * | 10/2019 | Arai ....................... H01B 7/423 |
| 2021/0021077 A1 * | 1/2021 | Mathews ............. B60L 53/302 |

* cited by examiner

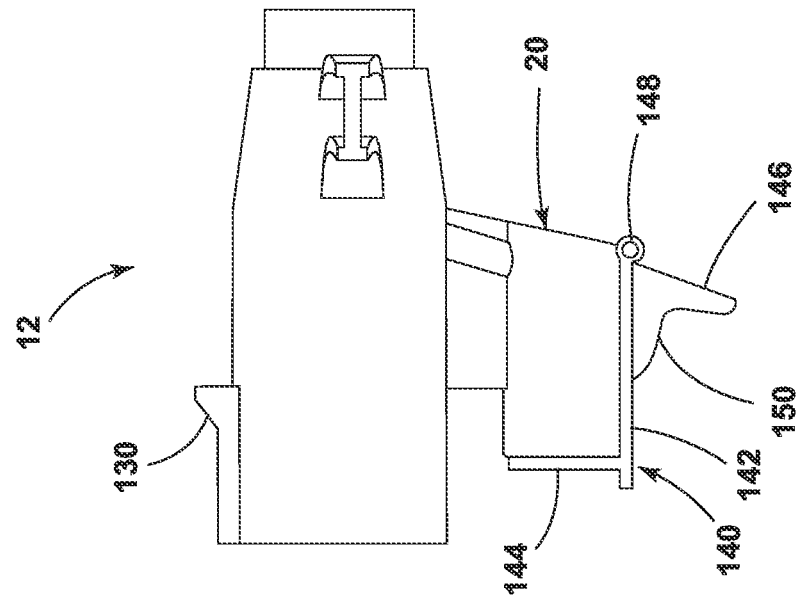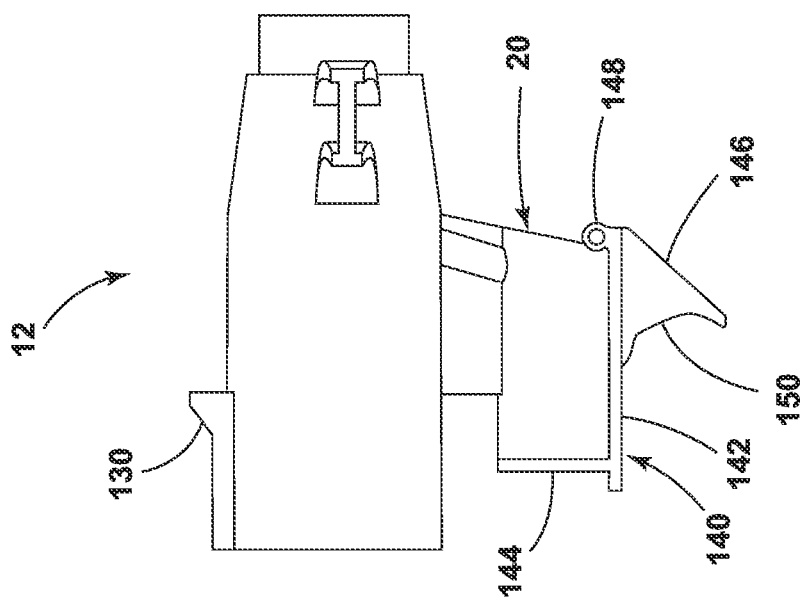
FIG. 10

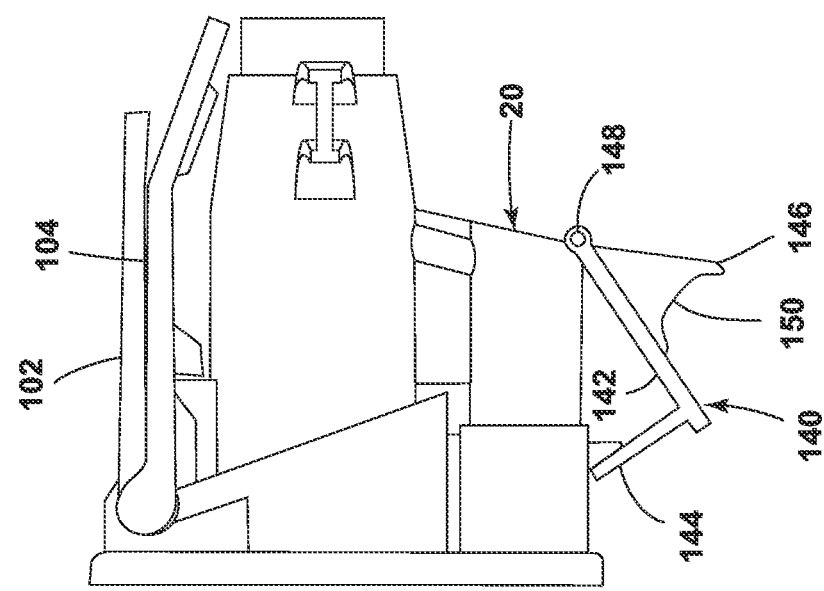
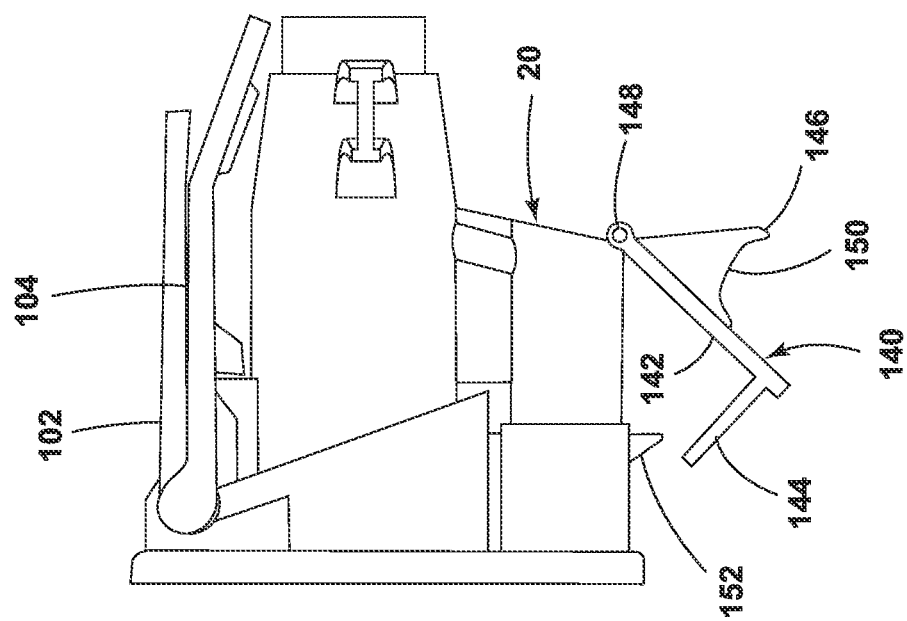
FIG. 11

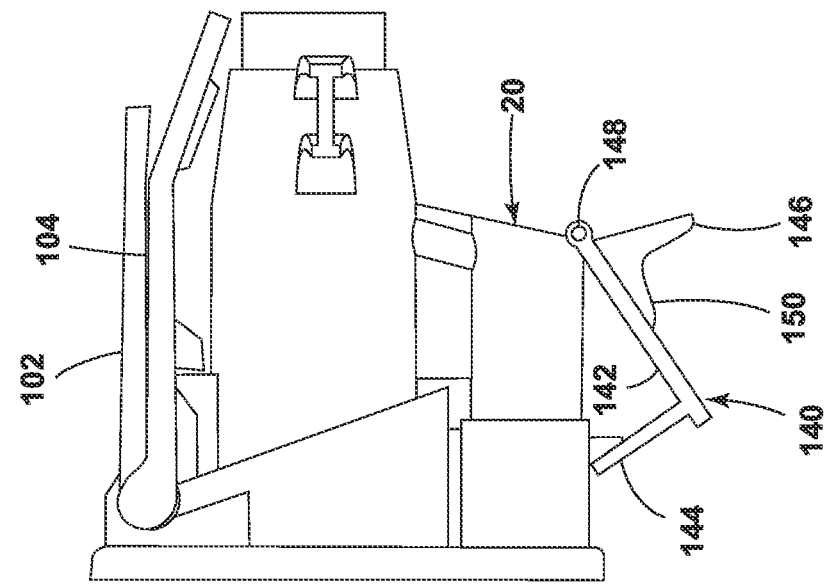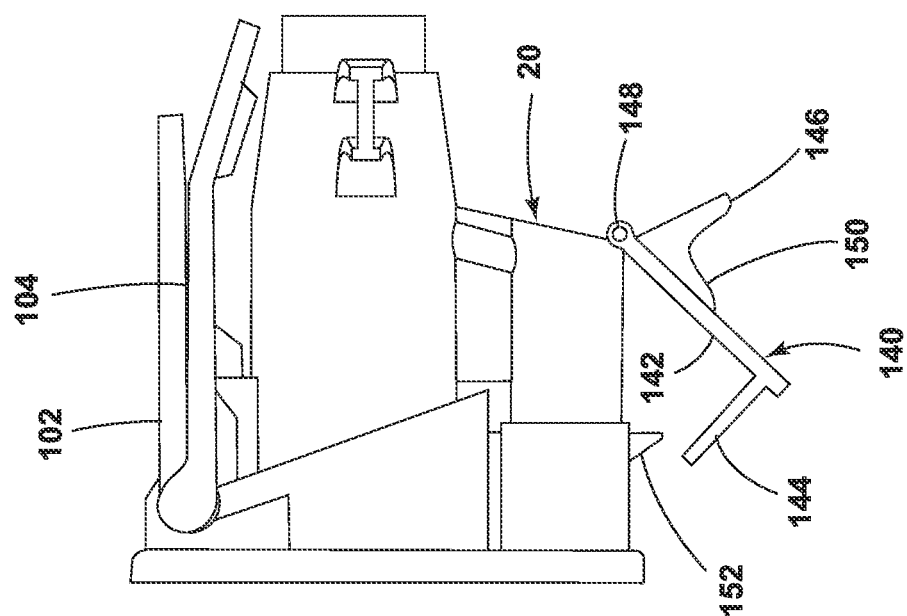
FIG. 12

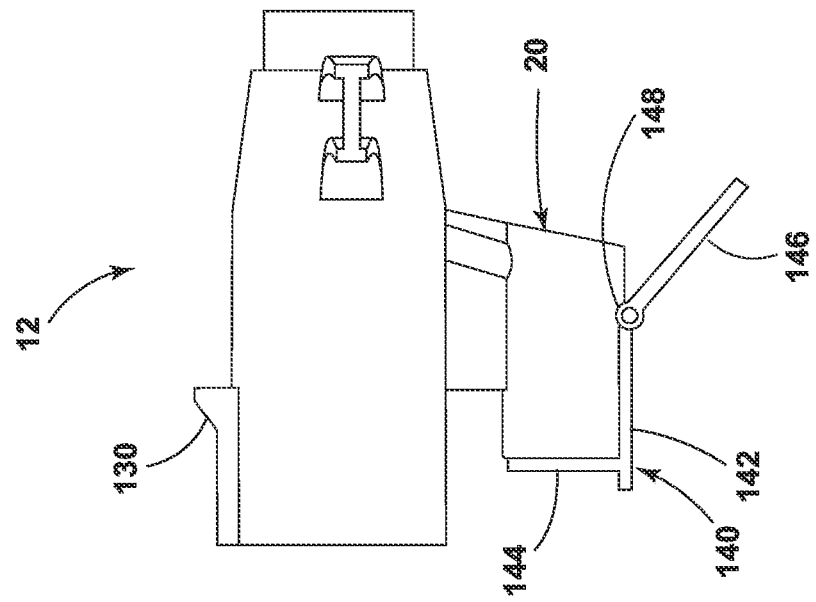
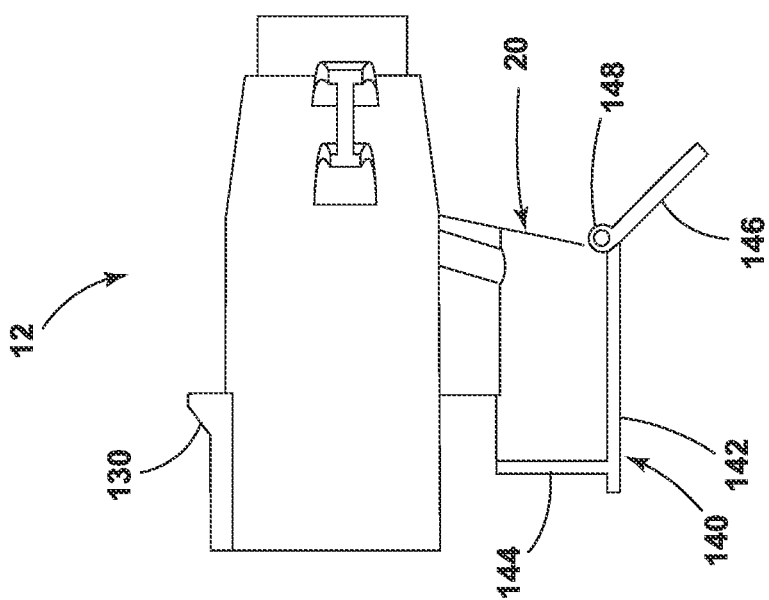
FIG. 13

ELECTRICAL CONNECTOR WITH ENHANCED DATA COMMUNICATION

CROSS-REFERENCE TO RELATED APPLICATIONS

This application claims the benefit of U.S. Provisional Application 62/985,102, filed Mar. 4, 2020, and U.S. Provisional Application 63/087,911 filed Oct. 6, 2020, the disclosures of which are incorporated by reference in its entirety.

FIELD OF THE INVENTION

The present invention relates to electrical connectors, and in particular, electrical connectors between tractor vehicles and trailer vehicles.

BACKGROUND OF THE INVENTION

A variety of standards exist for electrical connectors between tractor vehicles and trailer vehicles. As one example, electrical connectors meeting the SAE J560 standard include a seven-pin round connector (12V) for transferring electrical signals between a tractor vehicle and a trailer vehicle. The signals include tail lights, left and right turn lights, reverse lights, auxiliary power, and a ground return. However, the electrical connectors are not typically used to control brakes, except to provide power to an ABS unit at the trailer. Instead, trailer brakes are typically controlled using air pressure from a pneumatic connection to the trailer vehicle.

SAE J560 connectors provide power-line communications (PLC) between the tractor and the trailer, but with very limited data communication bandwidth. To provide increased bandwidth between the tractor and the trailer, it is known to provide backwards compatible solutions, for example modified electrical connectors with additional spring-loaded pins. However, spring-loaded pins are prone to failure over repeated uses, particularly after repeated connections with various different trailer vehicles.

Accordingly, there remains a continued need for an improved electrical connector compatible with existing standards, for example the SAE J560 standard, while providing enhanced electrical communications with a robust, durable construction.

SUMMARY OF THE INVENTION

An electrical connector for transferring electrical signals between a tractor vehicle and a trailer vehicle is provided, the electrical connector including a connector plug and a connector socket in compliance with an industry standard. The connector plug and the connector socket include a secondary electrical connection, not pertaining to the industry standard, to support bidirectional data communication between a tractor vehicle and a trailer vehicle with greater bandwidth, optionally in connection with an electronic braking system, video feeds, actuator controls, auxiliary systems, sensors, and detection systems.

In one embodiment, the connector plug includes a male end portion having a plurality of female contact terminals in compliance the SAE J560 (or other) industry standard, and the connector socket is shaped to receive the male end portion and includes a plurality of male contact terminals. The secondary electrical connection can include an additional electrical contact within a male part for engaging an additional electrical contact within a female part, wherein the male part and the female part are joined to, but laterally offset from, the connector plug and the connector socket. Alternatively, or in addition, the secondary electrical connection can include a conductive strip on an exterior annular surface of the connector plug and a corresponding electrical contact on an interior annular surface of the socket opening.

In another embodiment, the connector socket includes a first lid and a second lid, the first lid being biased in a closed position over the first plurality of male contact terminals, and the second lid being biased in a closed position over a female data connector. A portion of the first lid extends over a portion of the second lid, such that opening the second lid causes contact with the first lid to simultaneously open both lids. As with other embodiments, the connector socket retains backwards compatibility, such that the second lid can remain closed while the first lid is open for a SAE J560 connector plug. The connector plug of the current embodiment can also include a protective lid to guard against moisture and contaminants when not in use.

In still another embodiment, a double-ended trailer wire connector includes the connector plug at opposing ends, retaining compatibility for SAE J560 connector sockets. In these and other embodiments, the secondary electrical connection provides a robust alternative to spring-loaded pins. The secondary electrical connection can facilitate high speed data communications as part of a CAN network, an Ethernet network or other network, optionally in connection with the control of an electrically-controlled brake system, video feeds, actuator controls, auxiliary systems, sensors, and detection systems, all while retaining backward compatibility.

These and other features and advantages of the present invention will become apparent from the following description of the invention, when viewed in accordance with the accompanying drawings and appended claims.

BRIEF DESCRIPTION OF THE DRAWINGS

FIG. 10 includes side views of a connector plug including embodiments of a manually retractable lid for the data connector.

FIG. 11 includes side views of a connector plug including a manually retractable lid engaging a connector socket in accordance with one embodiment.

FIG. 12 includes side views of a connector plug including a manually retractable lid engaging a connector socket in accordance with another embodiment.

FIG. 13 includes side views of a connector plug including a manually retractable lid in accordance with another embodiment.

DETAILED DESCRIPTION OF THE CURRENT EMBODIMENTS

The current embodiments include an electrical connector for transferring electrical signals between a tractor and a trailer, the electrical connector being interoperable with one or more industry standard connectors. The electrical connector includes a connector plug and a connector socket each with a secondary electrical connection, not pertaining to the industry standard, to support bidirectional data communication between a tractor vehicle and a trailer vehicle with greater bandwidth, optionally in connection with an electronic braking system, video feeds, actuator controls, auxiliary systems, sensors, and detection systems.

Figure 1:
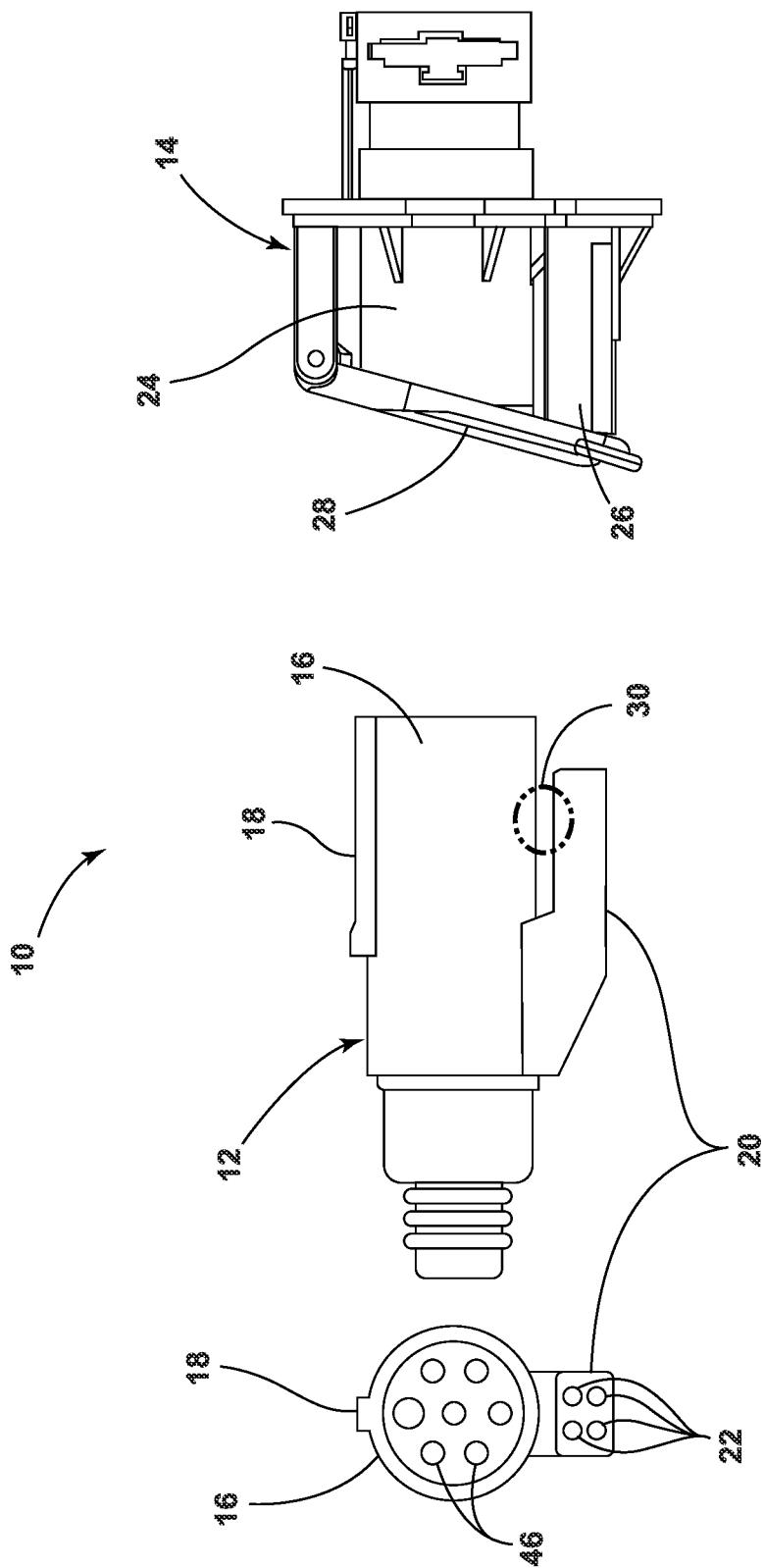
FIG. 1 includes views of an electrical connector having a secondary data connection in accordance with a first embodiment.

Referring first to FIG. 1, an electrical connector in accordance with a first embodiment is illustrated and generally designated 10. The electrical connector 10 includes a connector plug 12 and a connector socket 14. The connector plug 12 is a cable end portion having female contact terminals, and the connector socket 14 is a socket portion having male contact terminals. In the current embodiment, the connector plug 12 and the connector socket 14 adhere to the SAE J560/ISO 1185 standards pertaining to the shape and location of the male and female contact terminals. In particular, the connector plug 12 includes seven female contact terminals and the connector socket 14 includes seven male contact terminals 15 (shown in FIG. 6). A double-ended trailer wire connector (not shown) includes two connector bodies 12, one at each end, and a tractor and a trailer each include a connector socket 14. In use, the double-ended trailer wire connector remains connected between the tractor and the trailer. When not in use, the double-ended trailer wire generally remains connected to the tractor.

The connector plug 12 is generally circular in cross-section and is elongated, having an outer housing 16 formed of a non-conductive material. The outer housing 16 includes a locating rib 18 which cooperates with a keyway (not shown) in the connector socket 14. Beneath the connector plug 16, opposite of the locating rib 18, is provided a male data connector 20. The male data connector 20 is rigidly connected with, and extends parallel to, the outer housing 16. In addition, the male data connector 20 includes a plurality of female contact terminals 22, with four female contact terminals being shown in FIG. 1. Consequently, the double-ended trailer wire connector according to this embodiment includes eleven wires disposed therein—seven from the connector plug 16 and four from the male data connector 20—each being electrically isolated from each other along the length of the wire connector.

Similarly, the connector socket 14 is generally circular in cross-section, having an outer sleeve 24 with an inner diameter that approximately conforms to the outer diameter of the connector plug 12. The connector socket 14 includes the above-mentioned seven male contact terminals disposed therein according the SAE J560 standard. Beneath the connector socket 14 is provided a female data connector 26.

The female data connector 26 is integrally joined to, and extends parallel to, the outer sleeve 24 of the connector socket 14. The female data connector 26 includes four non-retractable male contact terminals 17 (shown in FIG. 6), such that there is one-to-one correspondence between the female contact terminals of the male data connector 20 and the male contact terminals of the female data connector 26. A lid 28 extends over the connector socket 14 and the female data connector 16 to prevent the accumulation of dirt and moisture when not in use. As further shown in FIG. 1, a gap 30 is defined between the connector plug 12 and the male data connector 20 to accommodate the outer sleeve 24 of the connector socket 14. When the male data connector 20 and the female data connector 26 are connected, a secondary electrical connection is formed. The secondary electrical connection can facilitate high speed data communications between the tractor vehicle and the trailer vehicle, for example CAN messaging and Ethernet protocols, optionally in connection with an electrically-controlled brake system, video feeds, actuator controls, auxiliary systems, sensors, and detection systems.

Figure 3:
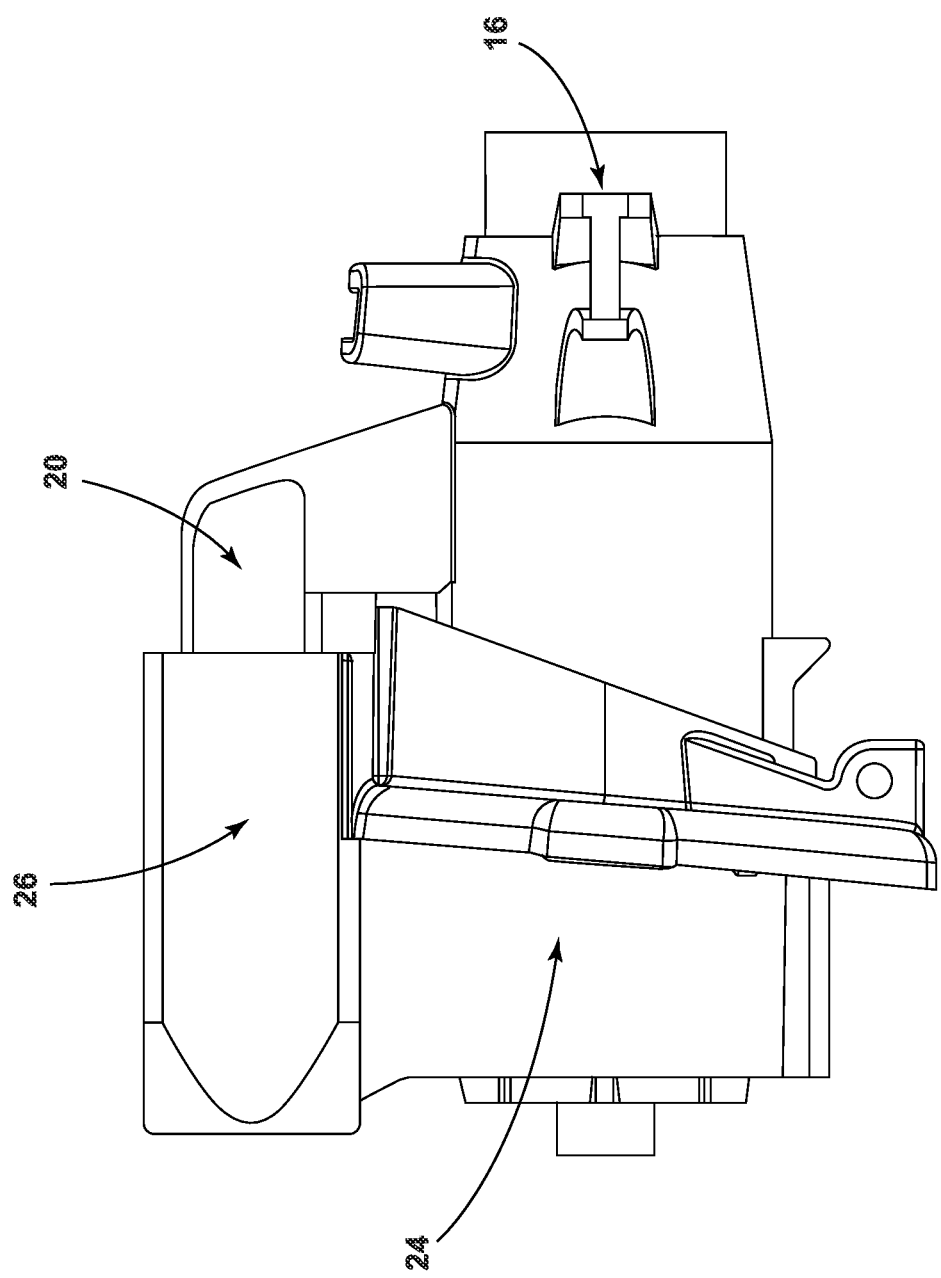
FIG. 3 includes a connector plug connected to a connector socket in combination with a secondary data connection.
Figure 4:
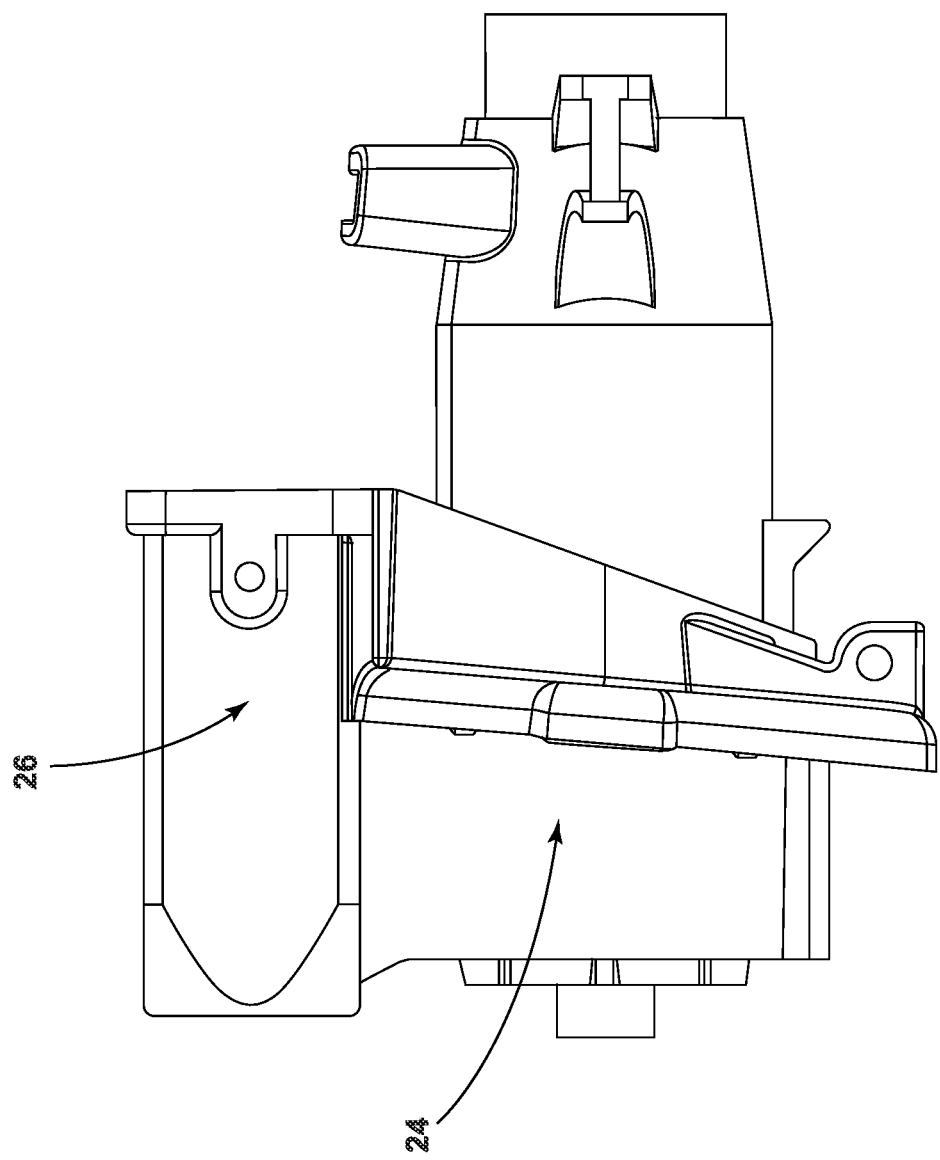
FIG. 4 includes an SAE J560 plug connected to a connector socket of the current embodiment, illustrating backwards compatibility of the connector socket.
Figure 5:
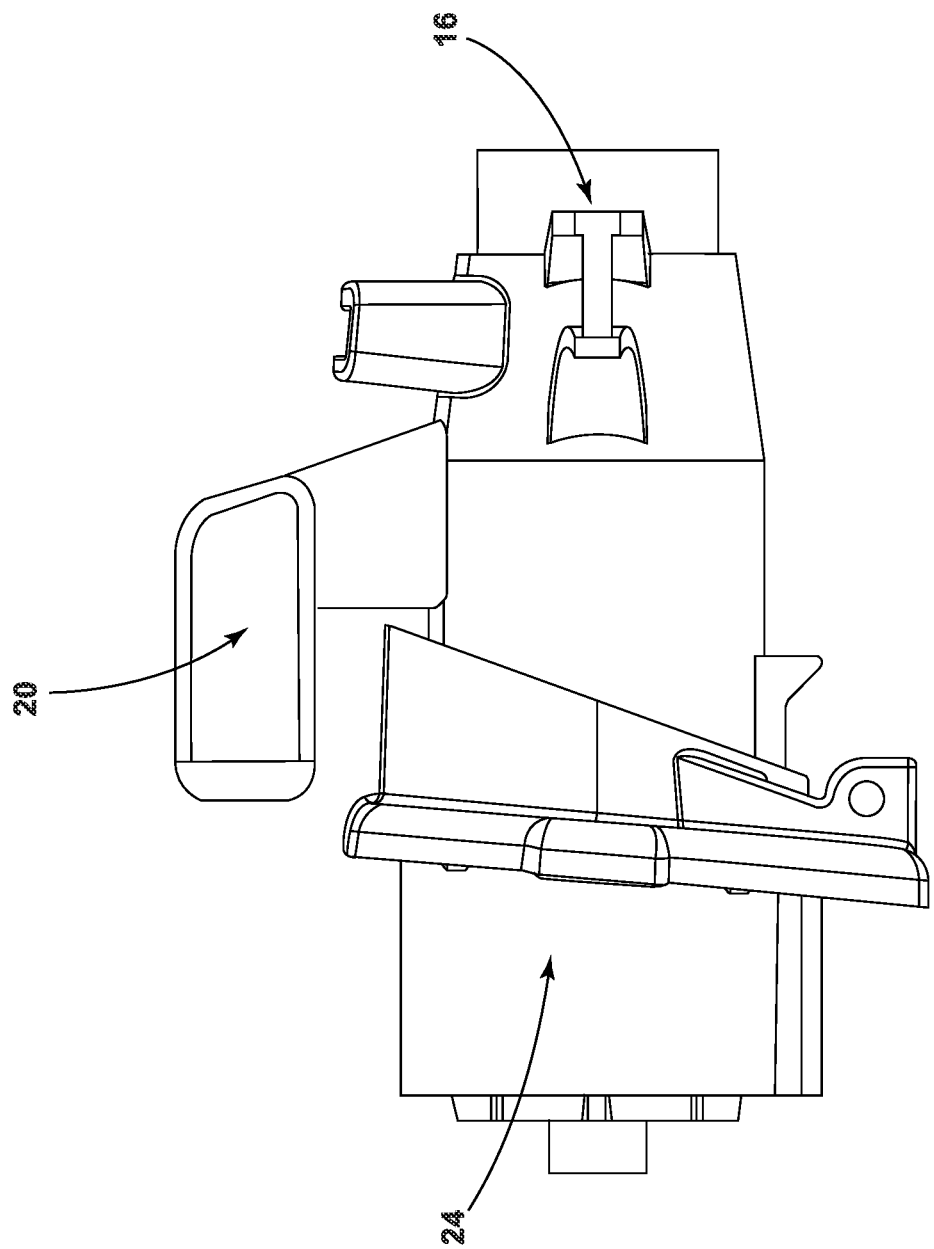
FIG. 5 includes a connector plug of the current embodiment connected to an SAE J560 socket, illustrating backwards compatibility of the connector plug.

As noted above, the connector plug 12 and the connector socket 14 each retain backwards compatibility with preexisting SAE J560 sockets. As shown in FIG. 3, the male end portion of the outer housing 16 of the connector plug 12 fits within the female opening in the outer sleeve 24 of the connector socket 14. Simultaneously, the male data connector 20 connects with the female data connector 26 to provide a secondary data connection. The secondary data connection is not limited to a specific number of electrical terminals therein, and can have one, two, four, or any other number of electrical terminals. As shown in FIG. 4, the connector socket 14 of the present embodiment is compatible with a preexisting SAE J560 plug, the SAE J560 plug lacking the male data connector 20 of FIG. 3. The connector socket 14 (joined to a tractor nose box for example) can receive the connector plug 12 of the present embodiment or an SAE J560 plug. As similarly shown in FIG. 5, the connector plug 12 of the present embodiment is compatible with a preexisting SAE J560 socket, the SAE J560 socket lacking a female data connector 26. Consequently, a double-ended trailer wire having a connector plug 12 at both ends has backwards compatibility with preexisting SAE J560 sockets.

Figure 2:
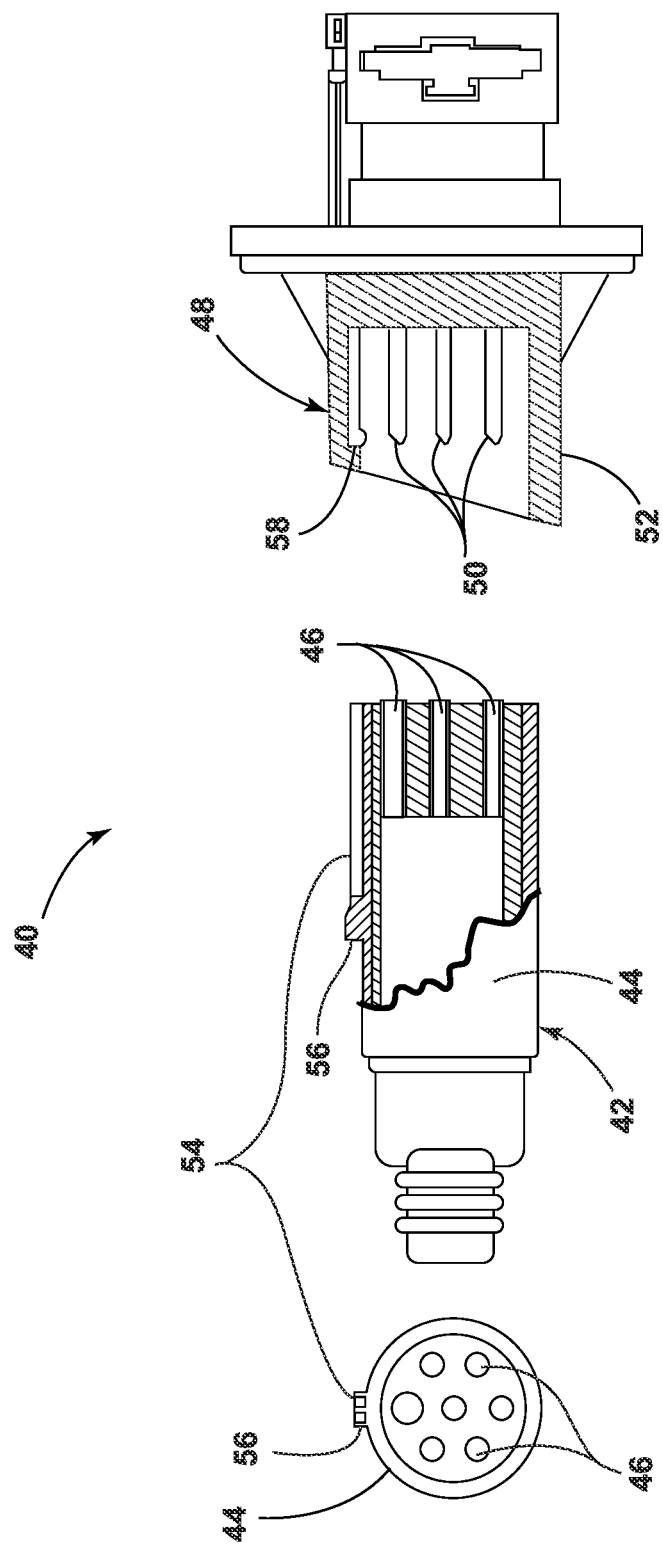
FIG. 2 includes views of an electrical connector having a secondary data connection in accordance with a second embodiment.

Referring now to FIG. 2, an electrical connector in accordance with a second embodiment is illustrated and generally designated 40. The electrical connector 40 of FIG. 2 includes a connector plug 42 that is generally circular in cross-section and is elongated, having an outer housing 44 formed of a non-conductive material. The connector plug 42 is a cable end portion having seven female contact terminals 46 in accordance with the SAE J560 standard. The connector socket 48 is a socket portion having seven male contact terminals 50 and is generally mounted to the tractor vehicle or the trailer vehicle. The connector socket 48 includes a cylindrical sleeve 52 formed of a non-conductive material with an inner diameter that approximately conforms to the outer diameter of the outer housing 44.

To provide a secondary electrical connection between the connector plug 42 and the connector socket 48, the connector plug 42 includes first and second conductive strips 54 within a recess in the locating rib 56. The conductive strips 54 extend parallel to each other for engaging with corresponding terminals 58 disposed in the keyway in the inner annular surface of the cylindrical sleeve 52 of the connector socket 48. The conductive strips 54 and the corresponding terminals 58 are each made of a conductive material and are non-retractable. The double-ended trailer wire connector according to this embodiment includes nine wires disposed therein—seven from the connector plug 42 and two from the conductive strips 54—each being electrically isolated from each other along the length of the wire connector. When the connector plug 42 and the connector socket 48 are connected, the secondary electrical connection is formed. The secondary electrical connection can facilitate high speed data communications between the tractor vehicle and the trailer vehicle, for example CAN messaging and Ethernet protocols, optionally in connection with an electrically-controlled brake system, video feeds, actuator controls, auxiliary systems, sensors, and detection systems. The connector plug 42 has backwards compatibility with SAE J560 sockets, in which instances the conductive strips 56 of the cable end portions are simply not used. Similarly, the connector socket 48 has backwards compatibility with SAE J560 trailer connectors, in which instance the conductive terminals 58 are not used. Though not shown, an optional lid can extend over the connector socket 48 to prevent the accumulation of dirt and moisture when not in use.

The number of contact terminals within the secondary data connection can vary from application to application. While four contact terminals 22 are shown in FIG. 1 and two contact terminals 54 are shown in FIG. 2, greater or fewer contact terminals can be used in other embodiments. In addition, the connector sockets of the present embodiments can include no lid or cover, can include a single lid or cover, or can include separate lids or covers to prevent the accumulation of dirt and moisture when not in use.

Figure 6:
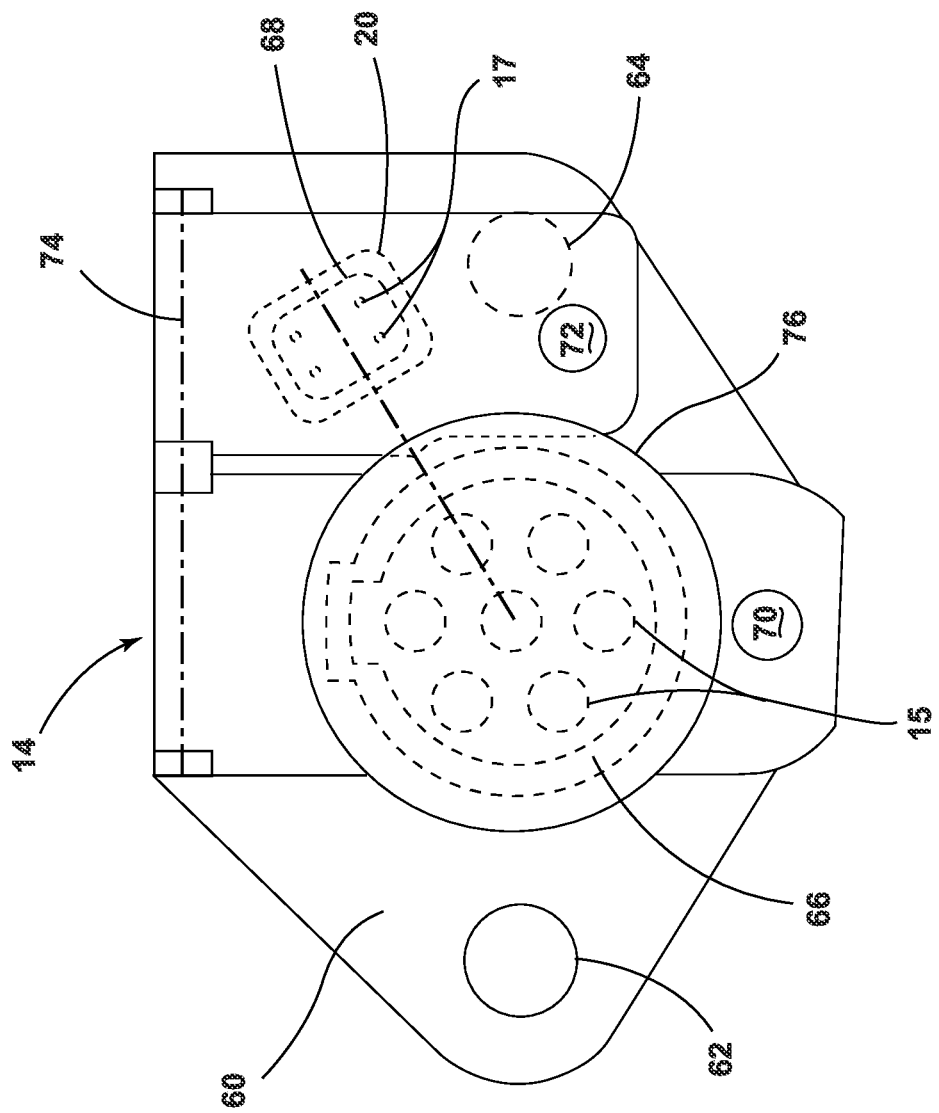
FIG. 6 is a front view of a connector socket including first and second spring-loaded lids in accordance with one embodiment.

As noted above, the connector plug 12 is of an SAE J560 design with an external housing extension 20 that includes connectors for communication connections. As shown in FIG. 6, the corresponding connector socket 14 includes a four-pin connector 20 for two twisted pairs of communication lines for CAN or Ethernet. The connector socket 14 includes a base plate 60 having fastener openings 62, 64 for attachment to a nose box. The connector socket 14 also includes a J560 socket opening 66 and a data connector opening 68 covered by respective spring-loaded lids 70, 72, which seal and shield the internal connector pins from weather and dust. As also shown in FIG. 6, the spring-loaded lids 70, 72 include a common hinge 74 and are positioned adjacent each other. The data connector lid 72 sits below and partially under a raised annular portion 76 of the J560 socket lid 70, such that the data connector lid 72, when lifted open, engages the J560 socket lid 70. Lifting the data connector lid 72 thereby opens both lids 70, 72 to accept the connector plug 12 and the male data connector 20. Lifting only the J560 socket lid 70 does not open the data connector lid 72, keeping the communication connection shielded when paired with a traditional SAE J560 plug, as shown in FIG. 4.

Figure 7:
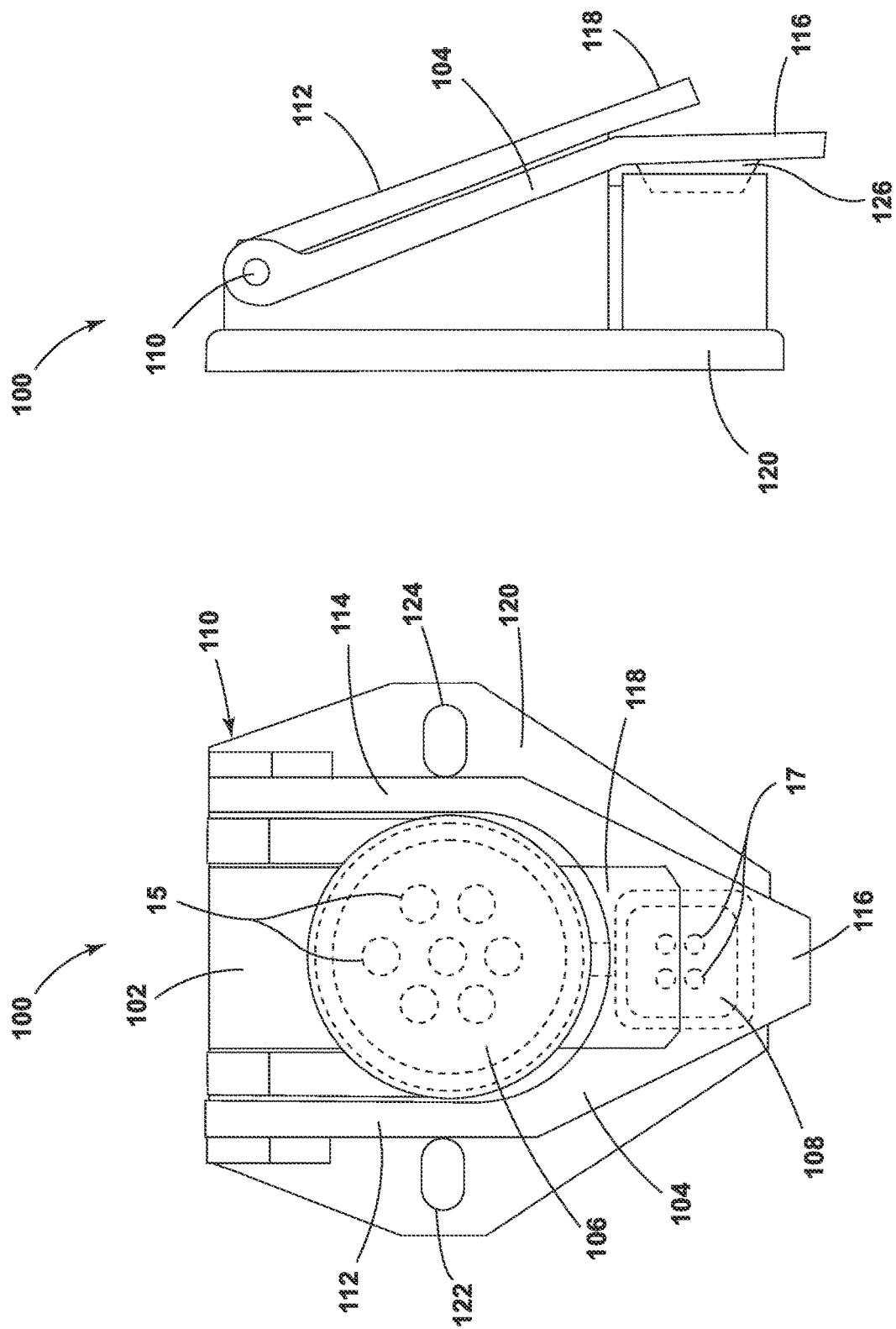
FIG. 7 includes front and side views of a connector socket including first and second lids in accordance with another embodiment.

As further optionally shown in FIG. 7, the connector socket 100 in accordance with a further embodiment includes first and second spring-loaded lids 102, 104 seated over a J560 socket opening 106 and a data connector opening 108, respectively. The first lid 102 is biased in a closed position over the J560 socket opening 106, and the second lid 104 is biased in a closed position over the data connector opening 108. The first and second lids 102, 104 share a common hinge 110, and the second lid 104 includes first and second leg portions 112, 114 that angle upwardly and straddle the J560 socket opening 106. The second lid 104 further includes a cover portion 116 joined to the first and second leg portions 112, 114, the cover portion 116 being generally triangular and seated over the data connector opening 108.

Figure 8:
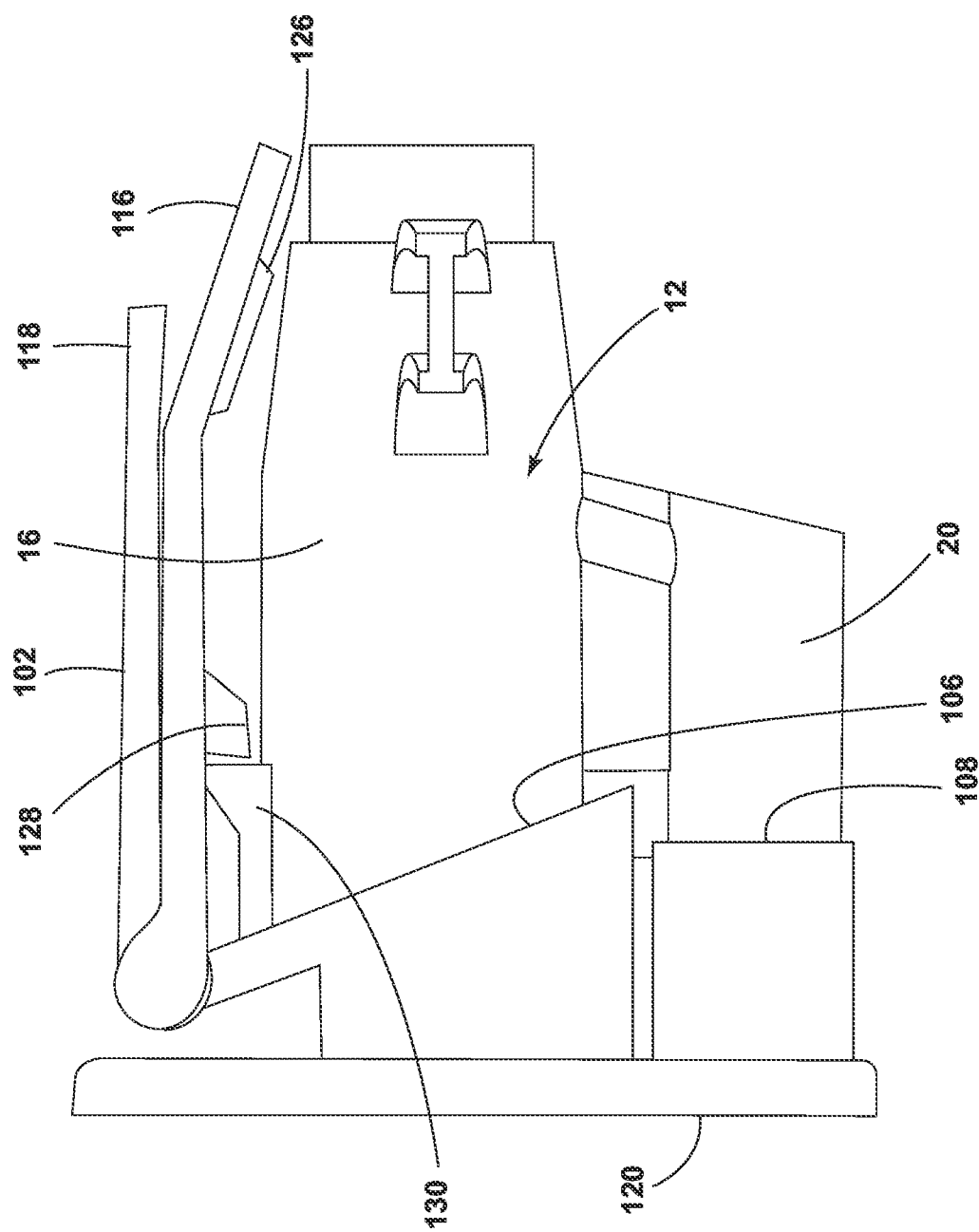
FIG. 8 is a side view of the connector socket of FIG. 7 mated to a connector plug of the present invention.
Figure 9:
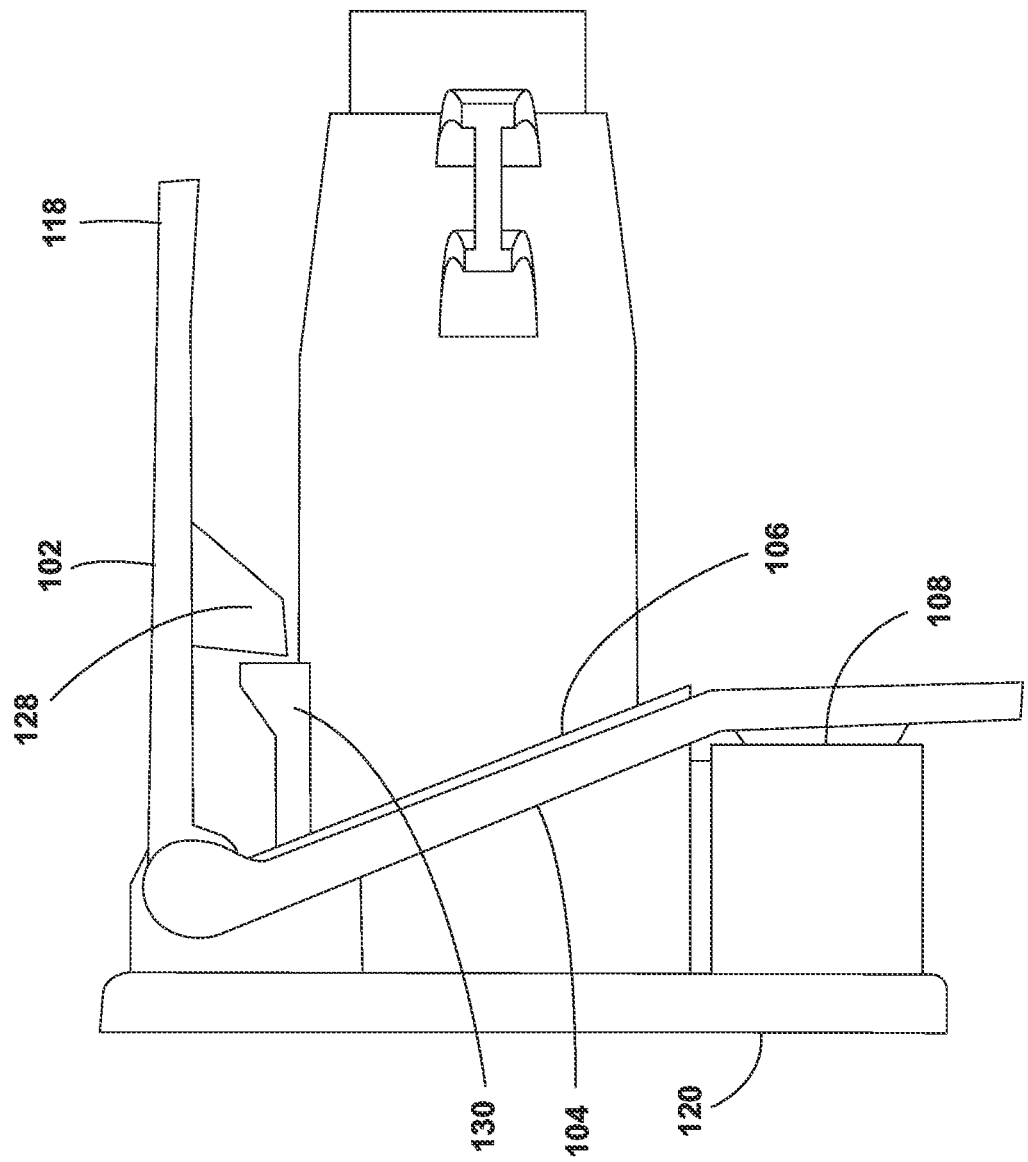
FIG. 9 is a side view of the connector socket of FIG. 7 mated to an SAE J560 plug, illustrating backwards compatibility.

The underside of the cover portion 116 includes a seal 126 to prevent moisture and contaminants from entering the data connector opening 108. The first lid 102 includes a rectangular flange 118 that extends over the cover portion 116. Rotation of the second lid 104 away from the data connector opening 108 causes contact with the first lid 102 to simultaneously rotate the first and second lids 102, 104 to an open position. In particular, the rectangular flange 118 is positioned forward of the cover portion 116 (when viewed from the side), such that rotation of the second lid 104 causes the cover portion 116 to engage the rectangular flange 118 through a complete range of movement for receipt of the connector plug 12, shown in FIG. 8. The second lid 104 can remain closed over the data connector opening 108 while the first lid 102 is open as shown in FIG. 9, such that the connector socket 100 retains backwards compatibility with conventional J560 connector plugs. Further, the connector socket 100 includes a base plate 120 having fastener openings 122, 124 for attachment to a nose box. The first lid 102 also includes a latch 128 that sits behind a raised portion 130 of the plug 12 to prevent accidental retraction of the connector plug 12 from the connector socket 100.

The connector plug 12 can optionally include a protective lid 140 for the male data connector 20. As shown in FIGS. 10-12, for example, the connector plug 12 includes an L-shaped protective lid 140 that is biased in a closed position. More specifically, the protective lid 140 includes an attachment arm 142, a cover portion 144, a thumb latch 146, and a spring-loaded hinge 148. The thumb latch 146 includes a concave surface 150 so that a user can ergonomically retract the L-shaped lid 140, with two different embodiments of the thumb latch 146 being shown in FIGS. 10 through 12. As further optionally shown in FIG. 13, the thumb latch 146 can instead comprise a lever arm that is rigidly coupled to the attachment arm 142 about the hinge 148. Depression of the thumb latch 146 causes the protective lid 140 to rotate about its hinge 148 into the open position. While the protective lid 140 is in the open position, the male data connector 20 can be received within the female data connector 26 of the connector socket 14. Consequently, the protective lid 140 guards against moisture and contaminants from entering the data connector 20 while not in use, for example during periods in which the connector cable is not connected to a trailer vehicle or during periods in which the connector cable is connected to a conventional J560 socket. In addition, the connector socket 14 includes a raised portion 152 having a ramped surface to engage the cover portion 144.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. An electrical connector comprising:
a connector plug including a male end portion defining a first plurality of female contact terminals, the connector plug further including a male data connector joined with and extending parallel to the male end portion and including a second plurality of female contact terminals; and
a connector socket adapted to receive the male end portion of the connector plug therein, the connector socket including a first plurality of male contact terminals, the connector socket further including a female data connector including a second plurality of male contact terminals;
wherein the first plurality of female contact terminals and the first plurality of male contact terminals provide a primary electrical connection, and wherein the second plurality of female contact terminals and the second plurality of male contact terminals provide a secondary electrical connection for data communication between a tractor vehicle and a trailer vehicle; and
wherein the connector socket includes a first lid and a second lid, the first lid being biased in a closed position over the first plurality of male contact terminals, and the second lid being biased in a closed position over the female data connector, wherein a portion of the first lid extends over a portion of the second lid, such that rotation of the second lid causes contact with the first lid to simultaneously rotate the first and second lids to an open position.

2. The electrical connector of claim 1 wherein the male end portion is in conformity with SAE J560 and wherein the connector socket is in conformity with SAE J560.

3. The electrical connector of claim 1 wherein the second plurality of male contact terminals are non-retractable male contact terminals.

4. The electrical connector of claim 1 wherein the data communication between the tractor vehicle and the trailer vehicle forms part of a CAN network or an Ethernet network.

5. The electrical connector of claim 1 wherein the connector plug includes a non-conductive housing that extends around the male socket portion and the male data connector.

6. The electrical connector of claim 1 wherein the connector plug includes a protective lid to removably seal the male data connector when not engaged with the female data connector.

7. The electrical connector of claim 6 wherein the protective lid is biased in the closed position by a spring-loaded hinge.

8. The electrical connector of claim 7 wherein the protective lid is operatively joined to a thumb latch, such that depression of the thumb latch acts causes the protective lid to rotate about the spring-loaded hinge to an open position.

9. The electrical connector of claim 8, further including an attachment arm coupled between the protective lid and the thumb latch.

10. The electrical connector of claim 9, wherein the female data connector of the connector socket includes a raised portion to engage the protective lid.

11. An electrical connector comprising:
a connector plug including a male end portion defining a plurality of female contact terminals, the male end portion further including a locating rib along an outer annular surface thereof, the locating rib including a plurality of conducting strips recessed therein; and
a connector socket adapted to receive the male end portion of the connector plug therein and including a plurality of male contact terminals, the connector socket including a keyway for the locating rib, the keyway including a conductive material adapted to engage the conducting strips within the locating rib,
wherein the plurality of female contact terminals and the plurality of male contact terminals are in compliance with an industry standard, and wherein the conducting strips within the locating rib and the conductive material within the keyway provide a secondary electrical connection, apart from the industry standard, for data communication between a tractor vehicle and a trailer vehicle.

12. The electrical connector of claim 11 wherein the connector plug is a first cable end portion of a double-ended trailer wire.

13. The electrical connector of claim 11 wherein the male end portion is in conformity with SAE J560 and wherein the connector socket is in conformity with SAE J560.

14. The electrical connector of claim 11 wherein the data communication between the tractor vehicle and the trailer vehicle forms part of a CAN network or an Ethernet network.

15. The electrical connector of claim 11 wherein the connector socket includes a protective lid to removably seal the female data connector when not engaged with the male data connector.

* * * * *